April 23, 1957 — M. M. TURNER — 2,789,496
FRUIT SLICE HOLDER AND JUICE SQUEEZER
Filed Dec. 12, 1955
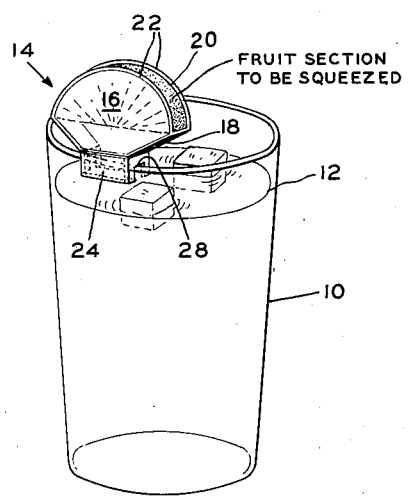
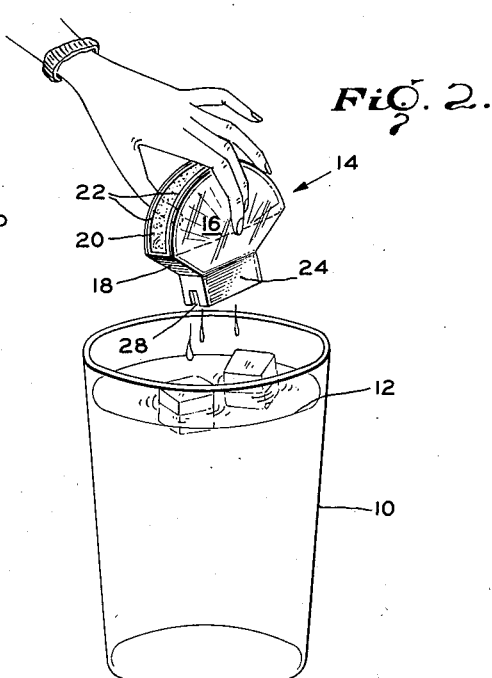
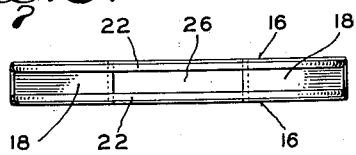
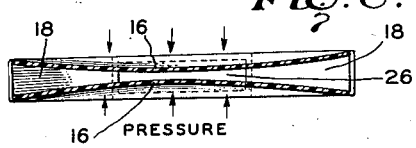
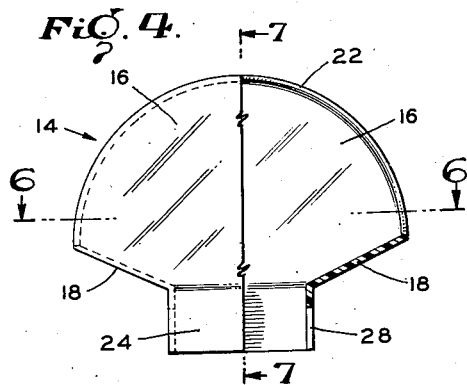
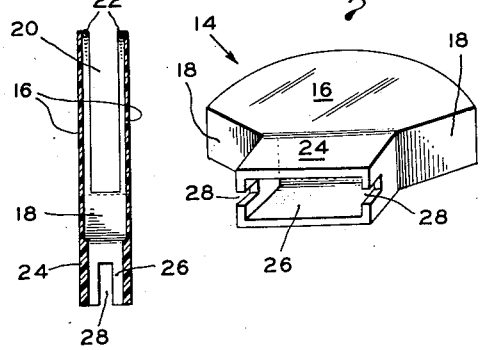
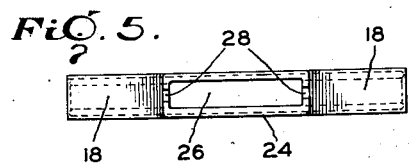
INVENTOR
Marion M. Turner.
BY Gustave Miller
ATTORNEY

2,789,496
FRUIT SLICE HOLDER AND JUICE SQUEEZER

Marion M. Turner, Kingsport, Tenn.

Application December 12, 1955, Serial No. 552,436

2 Claims. (Cl. 100—211)

This invention relates to a device for holding and squeezing fruit slices, and it particularly relates to a device, of the above type, which is suitable for holding the fruit slice on the rim of a cup, glass, or the like.

Heretofore, when iced tea or some other variety of beverage requiring a slice of lemon, orange, or the like, was served, the fruit slice was generally either placed on the side of the container, in a dish or saucer, or was pressed onto the rim of the beverage container. In either case, it was necessary to squeeze the juice from the slice into the beverage with the fingers. This was an obviously messy, unsanitary, and inconvenient process.

It is one object of the present invention to eliminate the above, as well as other disadvantages of the prior methods, by providing a holder for the fruit slice which can be set in place on the rim of the container until time for use, and which can then be removed from the rim, pressed to squeeze the juice from the fruit slice held therein into the beverage, and then returned to the rim where it can remain, not only free from unsightliness, but actually as a decorative feature.

Another object of the present invention is to provide a device which can be used to squeeze the juice from a fruit slice into a beverage without contacting the slice with the fingers.

Another object of the present invention is to provide a fruit slice holder for beverage containers wherein the holders are simple in construction and easily manipulated.

Other objects of the present invention are to provide an improved device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a perspective view of a glass of tea or the like, showing a holder, embodying the present invention, in place thereon.

Fig. 2 is a perspective view, similar to Fig. 1, but showing the holder removed from the container and in use.

Fig. 3 is a top plan view of the holding device shown in Figs. 1 and 2.

Fig. 4 is a side view, partly in elevation and partly in section, of the holder.

Fig. 5 is a bottom plan view of the holding device.

Fig. 6 is a cross-sectional view, as taken on line 6—6 of Fig. 4, but showing the side walls flexibly pressed in.

Fig. 7 is a vertical, cross-sectional view taken on line 7—7 of Fig. 4.

Fig. 8 is a perspective front view of the holder.

Referring now in greater detail to the drawing wherein similar reference characters refer to similar parts, there is shown a glass 10 having a liquid beverage, such as iced tea 12 therein.

On the top rim of the glass is positioned the fruit slice holder 14. This holder 14 comprises a pair of fan-shaped side walls 16 parallel and spaced from each other by end walls 18 at the bottom portions thereof. At its upper end, the holder 14 is provided with an open top 20 defined by the spaced-apart, convexly curved, upper edges 22 of the side walls 16.

At the lower end of the holder, the end walls 18 incline inwardly from the outer ends of the curved edges 22, to a neck portion 24. The neck portion 24 is provided with an open mouth 26, at each side of which is provided an upwardly extending slot 28.

The lower portion, or neck portion, 24 of the holder, is preferably made relatively rigid, whereas the upper portion, defined by the walls 16 and 18, is relatively flexible. Such construction may be obtained by making the device of a plastic material such as rubber, either natural or synthetic, or polyethylene. In using this type of material, the lower portion may be made with relatively thick walls and the upper portion with relatively thin walls. This is the type of construction indicated in Fig. 7.

Of course, the relative rigidity and flexibility can also be obtained by other means, such as varying the degree of polymerization between the material of the upper portion and that of the lower portion. It can also be obtained by vulcanizing the lower portion, either with or without an additional rigid support means.

Preferably, the holder is made of a transparent or translucent material, such as polyethylene, such a material also having the necessary qualities of flexibility. However, it is possible to construct the device of any one of a variety of materials, even including sheet metal.

In operation, a slice of lemon, or the like, is inserted into the upper portion of the holder through opening 20; after which the holder is positioned on the rim of the glass by inserting the slots 28 over the rim. In this position, the beverage is served, with the holder, which may be of any decorative design, acting as an ornament.

When it is desired to squeeze the juice from the lemon into the beverage, the holder is picked up, inverted as in Fig. 2, and the side walls 16 are then pressed together. This squeezes the juice from the slice, through the mouth 26 of the neck portion 24, into the beverage in the glass. When this has been done, the holder and its contents may either be laid aside or placed back on the rim of the glass, where it may still serve its decorative purpose.

Although this invention has been described in considerable detail, such description may be variously embodied, and the scope of the invention is to be determined as claimed.

Having thus set forth and disclosed the nature of this invention, what is claimed is:

1. An implement for squeezing fruit comprising a one-piece body of flexible material, said body having plane side wall members and plane end wall members interconnecting said side wall members to define therewith a flexible fruit squeezing shield having an open top, said plane side wall members being geometrically similar and each having an upper portion in the shape of a circular segment, an intermediate portion in the shape of an isosceles trapezoid with the longer base thereof defining the chord of said segment, and a lower portion of substantially rectangular configuration with one side of the rectangle defining the smaller base of said trapezoid, said upper portions being open along the edges to receive therebetween a fruit slice of similar shape thereto, said intermediate portions and said lower portions being closed at the ends by said end wall members, said intermediate portions having sloping walls adapted to support a fruit slice to be squeezed in said device for expressing juice therefrom, said lower portions having aligned slots in opposite walls thereof adapted to position said device for support thereof on the rim of a receptacle.

2. An implement for squeezing fruit comprising a one-piece body of flexible material, said body having plane side wall members and plane end wall members interconnecting said side wall members to define therewith a flexible fruit squeezing shield having an open top and bottom, said plane side wall members being geometrically similar and each having an upper portion in the shape of a circular segment, an intermediate portion in the shape of an isosceles trapezoid with the longer base thereof defining the chord of said segment, and a lower portion of substantially rectangular configuration with one side of the rectangle defining the smaller base of said trapezoid, said upper portions being open along the edges to receive therebetween a fruit slice of similar shape thereto, said intermediate portions and said lower portions being closed at the ends by said end wall members to define a funnel portion and a mouth portion respectively, said funnel portion having sloping walls adapted to support a fruit slice and direct juice expressed therefrom to said mouth portion, said mouth portion being open at the bottom for egress of expressed juice and having aligned slots in opposite walls thereof adapted to position said device for support thereof on the rim of a receptacle.

References Cited in the file of this patent
UNITED STATES PATENTS

| | | |
|---|---|---|
| 1,858,435 | Conlon | May 17, 1932 |
| 2,014,236 | McNamara | Sept. 10, 1935 |
| 2,235,909 | Wald | Mar. 25, 1941 |
| 2,688,914 | Eckler | Sept. 14, 1954 |